Feb. 2, 1965 P. A. NILSEN ETAL 3,168,597
FOUNTAIN TYPE WHIPPED CREAM MAKER
Filed Nov. 2, 1960 2 Sheets-Sheet 2
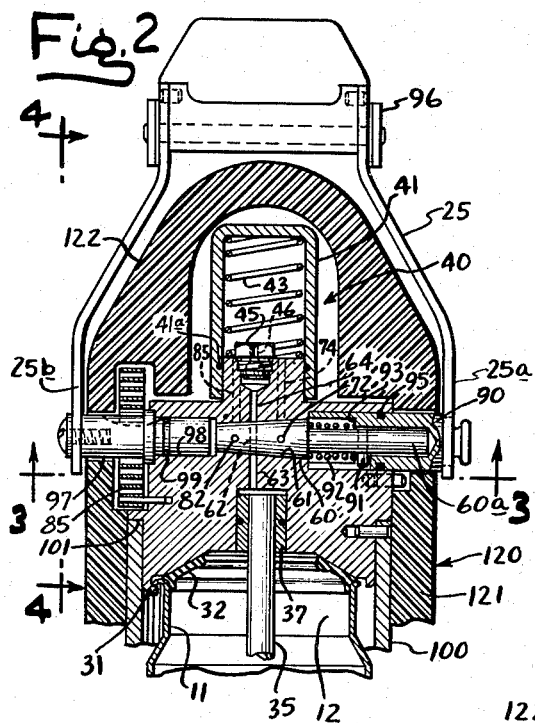
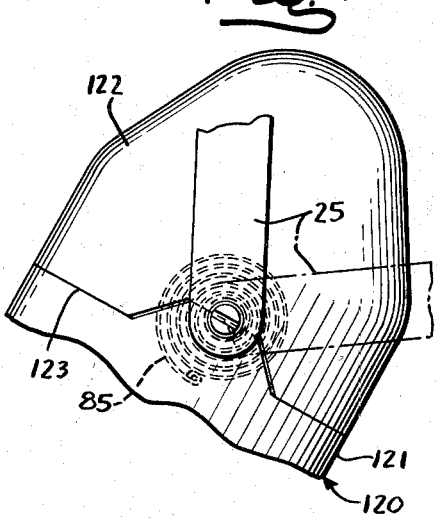
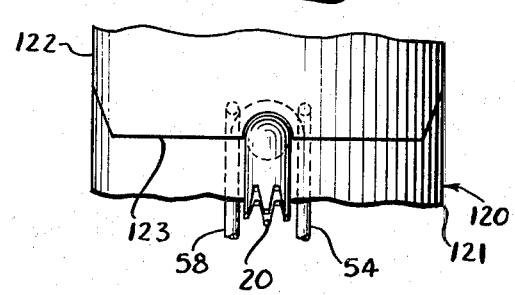
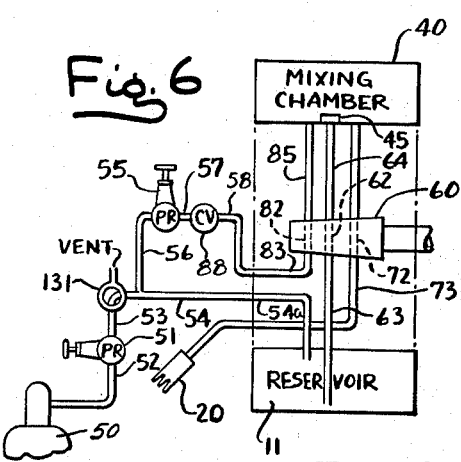
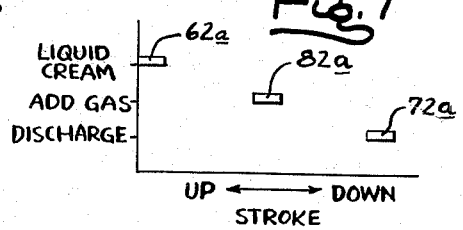
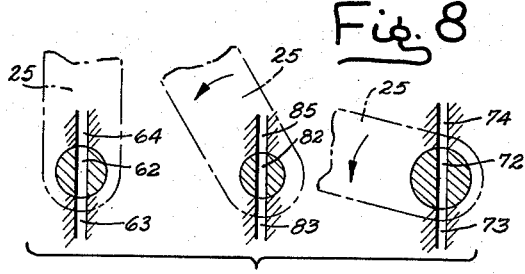
INVENTORS
PETER A. NILSEN
THEODORE R. SCHULZ
by: Wolfe, Hubbard, Voit & Osann
ATTYS.

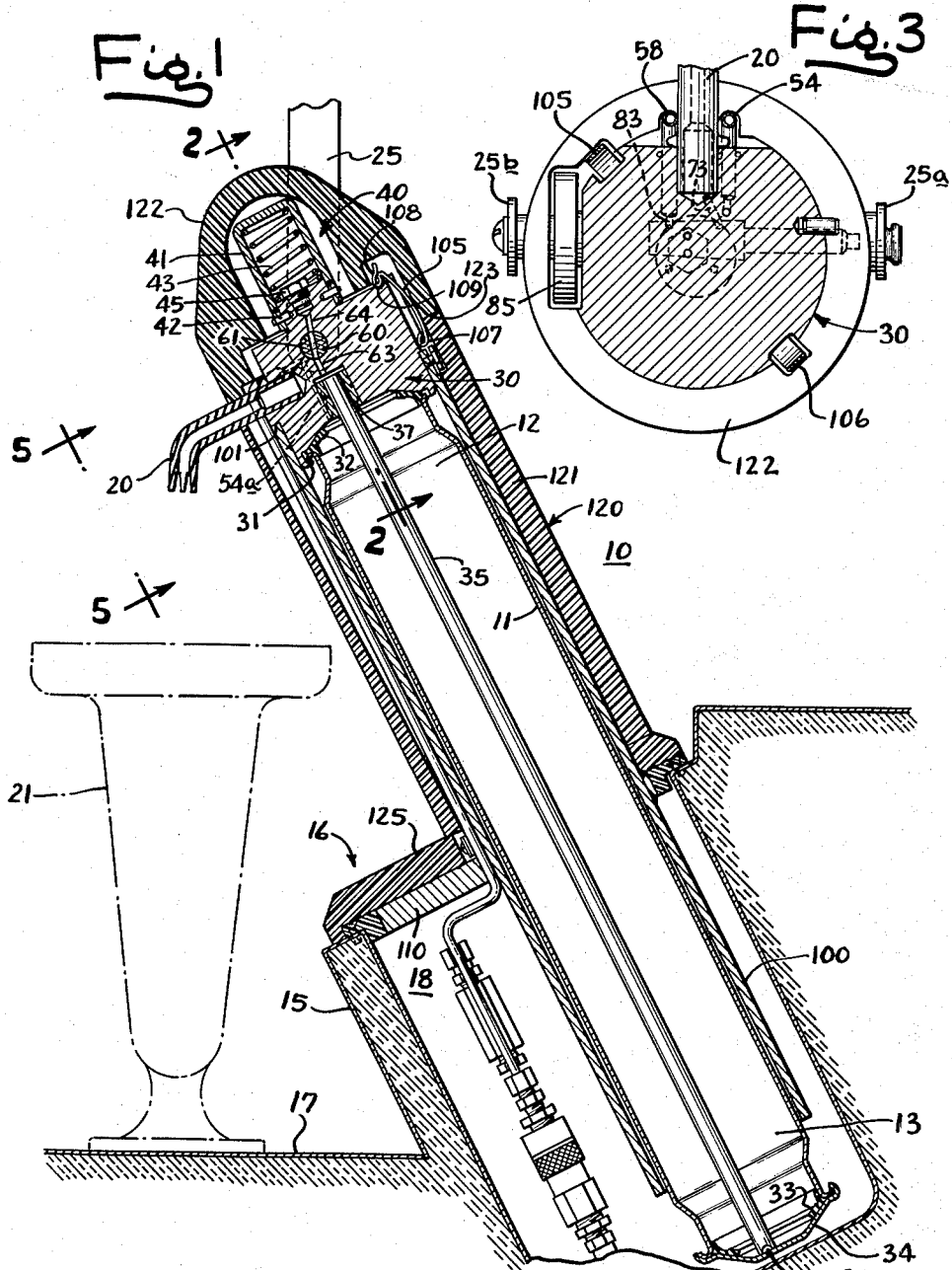

3,168,597
FOUNTAIN TYPE WHIPPED CREAM MAKER
Peter A. Nilsen, Villa Park, and Theodore R. Schulz, Prospect Heights, Ill., assignors, by mesne assignments, to Nilsen Mfg. Co., Haines City, Fla., a corporation of Florida
Filed Nov. 2, 1960, Ser. No. 66,772
3 Claims. (Cl. 261—50)

The present invention relates to whipped cream makers and more particularly to a combined maker and dispenser suitable for use in the syrup rail of a "soda fountain" or the like.

In our copending application Serial No. 66,748 filed concurrently herewith, there is disclosed a whipped cream maker capable of making whipped cream either in individual sized servings or in larger batches, the unit being free standing and having a large upper reservoir for storing the liquid cream under pressure. It is the primary object of the present invention to provide a whipped cream maker which embodies various features of modification and improvement which makes the unit particularly well suited for integrating into the standard fixtures of a soda fountain, drugstore, restaurant or the like. It is a more specific object to provide a whipped cream maker which is of compact cylindrical shape capable of being recessed within a conventional syrup rail and projecting upwardly therefrom only to the extent necessary to provide clearance for the upright glassware usually employed in soda fountains. It is a related object to provide a whipped cream maker capable of making whipped cream in individual sized batches which avoids the necessity for taking up counter space and which is unobtrusive and pleasing in appearance.

It is another object of the present invention to provide a whipped cream maker which does not require special refrigerating coils or facilities and which, instead, makes use of the refrigeration already available in a refrigerated syrup rail of conventional type. In this connection it is an object to provide a whipped cream maker which projects upwardly from the syrup rail but which is nevertheless kept at a safe low temperature throughout its entire length. It is another object to provide a whipped cream maker which may be simply and inexpensively insulated against entry of heat from the environment and in which insulation is employed to provide attractive and smoothly rounded contour.

It is an object of the invention in one of its aspects to provide a whipped cream maker which meets the requirements of the various health authorities, which is made up of a minimum number of parts and which may be easily disassembled for effective periodic cleaning.

It is still another object of the present invention to provide a whipped cream maker for a soda fountain or the like which is extremely rapid in operation and which insures intimate mixture of the liquid cream and aerating gas in the mixing chamber prior to discharge. In this connection it is an object to provide a whipped cream maker which may be rapidly cycled with assurance that successive portions of whipped cream will be of high and uniform quality. It is a specific object to provide a whipped cream maker having a mixing chamber in which the cream is added in the form of a jet or spray from the bottom of the chamber to produce foaming and turbulence of the cream in the chamber with an extremely large total surface available for gas absorption.

It is a still further object of the present invention to provide a whipped cream dispenser in which there is no "spitting" or "blowing" at the end of the discharge of an individual serving. On the contrary, the mixing chamber is discharged down to atmospheric pressure so that the whipped cream used as a topping is deposited in place gently and without spoiling its appearance. It is a related object to provide a whipped cream maker which is easily operated having a single operating lever, one stroke of which accomplishes a number of functions including the admission of a predetermined charge of gas to the mixing chamber during a short intermediate portion of the stroke.

It is a final object to provide a whipped cream maker which is of inherently simple, low cost construction and which may be economically used by even the smallest soda fountain establishments.

Other objects and advantages of the invention will become apparent upon reference to the attached detailed description and upon reference to the drawings in which:

FIGURE 1 is a vertical section of a whipped cream maker constructed in accordance with the present invention, showing the same mounted in the syrup rail of a soda fountain or the like.

FIG. 2 is a fragmentary section of the upper or operating portion of the device shown in FIG. 1 and taken along the line 2—2 in that figure.

FIG. 3 is a transverse section taken at the level of the discharge nozzle and along the line 3—3 in FIG. 2, looking upwardly to show the porting arrangement.

FIG. 4 is a fragmentary side view looking along the line 4—4 in FIG. 2.

FIG. 5 is a fragmentary front view looking along the line 5—5 in FIG. 1.

FIG. 6 is a schematic diagram showing the source of pressurized gas, the pressure regulators and the valving arrangement.

FIG. 7 is a valve diagram showing successive opening and closing of the valve ports during upward and downward strokes of the control handle.

FIG. 8 is a diagram showing the valve port connections for three positions of the control handle.

Turning now to the drawings, a whipped cream maker constructed in accordance with the present invention is generally indicated at 10. The device has an elongated body 11 having an upper end 12 and a lower end 13. The lower end 13 is adapted to be received in a syrup rail 15 having an inclined face 16 with an adjacent counter top 17. The syrup rail 15 will be recognized by one skilled in the art as a conventional refrigerated fixture defining a central refrigerated space 18 and providing a series of wells for receiving open-topped containers used to store the various syrups and fruits, including fresh fruits, required in the operation of a soda fountain. Suitable refrigerating coils (not shown) are provided within the space 18 for maintaining a low temperature under thermostatic control.

Projecting forwardly from the top portion of the whipped cream maker 10 is a discharge nozzle 20 which may be formed of soft rubber or the like and positioned to discharge whipped cream into a suitable glass or cup 21 shown in dot-dash outline. Straddling the whipped cream maker at its upper end, is an operating handle 25. As will be covered in detail in the paragraphs which follow, pulling forwardly on the handle 25 produces discharge of an individual sized serving of whipped cream, generally in the form of a topping, into the glass 21.

Mounted at the upper end of the reservoir 11 is a valve body 30 having a twist type connection 31 with the upper end of the reservoir, the members being sealed together by a gasket 32. A similar gasket 33 is used at the lower end of the reservoir in cooperation with a cap 34. The reservoir may be formed of stainless steel and the cap 34 and gaskets 32, 33 may be the same as employed in refillable type whipped cream dispensers as, for example, disclosed in the prior United States Nilsen Patent 2,580,188. For the purpose of discharging liquid cream at the upper end of the reservoir, a feed tube 35 extends centrally through the reservoir having an inlet 36 at the bottom and having a sealed connection 37 with the valve body 30 at its upper end.

In accordance with the present invention, a mixing chamber is mounted on the valve body at the upper end of the reservoir and means are provided in the valve body for charging the mixing chamber with gas, admitting cream under high pressure from the reservoir to the mixing chamber, and for discharging the cream in whipped form through the discharge nozzle 20. In the present instance, the mixing chamber, generally indicated at 40, is in the form of an inverted cup 41 having a bayonet connection 42 with the valve body and with a coil spring 43 to provide the necessary detenting force for the bayonet connection. An O-ring 41a in the lip of the cup provides a pressure-tight seal. Further in accordance with the invention, a spray head 45 having an orifice 46 is provided in the bottom of the mixing chamber 40 so that when the liquid cream is admitted to the mixing chamber under high pressure, it enters in the form of a high velocity spray or jet which, projected upwardly through the liquid cream in the mixing chamber, causes rapid agitation and foaming thereby producing a large surface area for absorption of the gas contained in the mixing chamber.

Prior to discussing the valving arrangement for connecting the reservoir to the mixing chamber and the mixing chamber to the discharge nozzle, reference may be made to the system employed for supplying gas pressure to the device. Thus referring to FIG. 6, a source of gas 50 is provided which may, for example, be a high pressure tank having nitrous oxide or other suitable aerating gas at a pressure upwards of 300 pounds. Gas from the source is passed through a first pressure regulating valve 51 having an inlet 52 and an outlet 53. The outlet is connected to the reservoir 11 by a line 54 so that the reservoir is maintained at a pressure on the order of 200 pounds per square inch and which may range between, say, 150 pounds and 250 pounds per square inch. A port 54a formed in the valve body completes the high pressure path. Connected to the outlet of the pressure regulating valve 51 is a second pressure regulating valve 55 having an inlet 56 and an outlet 57. The outlet is connected to the mixing chamber 40 via a line 58 so that the pressure of the gas supplied to the mixing chamber is at a lower pressure than that in the reservoir, a pressure differential on the order of 25 to 175 pounds per square inch being preferred.

In carrying out the present invention, a rotatable valve member is provided in the valve body together with ports so that the mixing chamber is connected to the reservoir when the valve handle is in its uppermost position and so that the mixing chamber is connected to the discharge nozzle when the handle is drawn forwardly to the discharge position shown dot-dash in FIG. 4. Thus, in the present embodiment, a valve member 60 in the form of a tapered plug is rotatable in a transverse bore 61 formed in the valve body. Formed in the valve member is a cream inlet port 62 which is aligned with a lower passage 63 which communicates with the feed tube 35 as well as an upper passage 64 which communicates with the spray nozzle 45. For the purpose of discharging cream from the reservoir, the valve member 60 includes a second port 72 arranged approximately at right angles to the first mentioned port 62. Aligned with the port 72 is a lower or discharge passage 73 which, as shown in FIGS. 3 and 6, communicate with the discharge nozzle 20. Above the port 72 in the valve member and aligned with it is a passage 74. It will be apparent, then, that when the operating handle 25 is in the upper position illustrated, a direct connection is provided between the reservoir 11 and the mixing chamber 40 and when the operating handle 25 is rocked forward communication is established from the mixing chamber to the discharge nozzle.

In accordance with one of the features of the invention, a source of gas pressure is not continuously connected to the mixing chamber as in the above mentioned copending application, but is connected to the mixing chamber only momentarily during the center portion of the stroke of the operating handle. For this purpose, a third port 82 is provided in the valve member 60. Generally aligned with this port is a gas inlet passage 83 (see FIG. 3) which is connected to the pressure supply line 58 and an upper passage 85 which is in communication with the mixing chamber 40. The port 82 is so phased with respect to the position of the handle 25 that communication is established between the gas supply line 58 and the mixing chamber when the operating handle is centered about the 45 degree or mid position.

In order to visualize the phasing of the valve ports, reference is made to FIG. 7 which shows the open position of the ports relative to limits of the stroke of the operating handle. In considering a typical operating sequence, let it be assumed that a handle 25 is in the "down" position following discharge of an individual sized batch of whipped cream from the discharge nozzle. Under such conditions, the port 72 is opened as indicated at 72a. Movement of the handle in the upward direction closes the port 72 and opens the port 82 so that a charge of gas is admitted from the supply line 58 to the mixing chamber as indicated at 82a. Further movement of the handle shuts off the port 82 and opens the port 62 to interconnect the reservoir and the mixing chamber. When the valve port 62 is opened, liquid cream under high pressure spurts in a high velocity stream through the spray nozzle 45. The spray is initially finely divided, but as the level of cream builds up within the mixing chamber the stream passes through the collected cream. The upward discharge of the stream of liquid cream through the body of cream collecting in the mixing chamber produces rapid agitation and frothing thereby exposing a large area of liquid cream for absorption of the aerating gas. As the level of cream builds up in the mixing chamber the pressure in the mixing chamber increases to the point where it approaches the pressure in the reservoir cutting off further flow. The size of the mixing chamber is so small that this cut-off occurs when only one serving of cream has entered. A "serving" of whipped cream shall be understood to be a small quantity repetitively required as a topping in a soda fountain or the like for an individual order or portion. The precise amount may be varied by slight variation in the size of the cup 41. Preferably a spring 85 is provided to maintain the operating handle 25 normally in the upwardly extending position.

When it is desired to discharge the serving of whipped cream and the handle 25 is pulled downwardly, the port 62 closes and communication with the reservoir is cut off. During the forward stroke of the handle, the mixing chamber is again connected to the gas supply line 58. However means are provided for preventing any reverse flow through the supply line. Thus, the pressure reducing valve 55, by its nature, prevents reverse flow and, in addition, a check valve 88 is preferably provided in the line. Continued forward movement of the handle again closes off the port 82 and opens the port 72 so that the cream, fully charged with the dissolved aerating gas, escapes through the port 73 and through the nozzle 20 for discharge in the glass 21. It is to be noted that the discharge of the mixing chamber takes place fully, down to atmospheric pressure. Consequently there is no "spitting" or "blowing" at the end of the discharge as might occur where the mixing chamber is continuously connected to a source of aerating gas. As a result, the whipped cream is deposited gently which is particularly important where the whipped cream is used as a decorative topping.

Attention may next be directed to the means for maintaining the valve member captive and for removing it when cleaning becomes necessary. At its right hand end (FIG. 2) the valve body is provided with a stem 60a which is fitted within a cylindrical bushing 90. At its outer end, the bushing is coupled to the right hand portion 25a of the handle 25 for rotation with the latter. For the purpose of coupling the bushing 90 and the valve stem 60a together, a pin 91 is used, and for urging the valve stem inwardly there is provided a spring 92 which seats on a shoulder 93 internally formed in the bushing. The bushing is sealed with respect to the valve body by an O-ring 95. To disassemble the valve it is sufficient to unscrew the knurled nut 96 at the upper end of the handle which frees the side member 25a and enables the bushing 90 and the valve member 60 to be withdrawn. This frees the valve bore 61 and provides access to the various passages.

For supporting the left hand member 25b of the handle 25, a rotatable stub shaft 97 is provided which fits in a bore 98 in the valve body and which is sealed by an O-ring 99. The stub shaft 97 is, as shown, connected to the inner end of the return spring 85, for biasing the handle into its upwardly extending position.

In accordance with one of the features of the invention, the elongated reservoir 11 is jacketed by a tube of good conducting metal which extends at its lower end into the refrigerated syrup rail and which is thermally coupled to the valve body 30 at its upper end so that the valve body and cream reservoir are at all times maintained at a low preserving temperature without need for additional refrigeration. Moreover, the mixing chamber, being small and intimately coupled to the valve body is kept at the same low temperature. In the present instance, the jacket indicated at 100 is made of a cylinder of aluminum and is seated at its upper end on a shoulder 101 formed in the valve body. In order to maintain the members clamped together, a pair of hold down clips are employed as indicated at 105, 106, the clip 105 shown in FIG. 1 being taken as representative. Such clip is freely pivoted at its lower end 107 and has a hook 108 at its upper end which overlies the valve body and which may be received in a shallow detent groove 109 formed in the latter. In order to insure maximum thermal coupling between the refrigerated space 18 in the syrup rail and the jacket, as well as to provide physical support, the jacket preferably is secured, as by welding, to a plate 110 preferably insulated along its edge and the edge of which is formed to fit into one of the openings in the syrup rail.

For the purpose of insulating the jacket 100, the valve body 30 and the mixing chamber 40 while, in addition, providing an attractive appearance, an insulating jacket 120 is provided having a lower cylindrical portion 121 and an upper cap shaped portion 122, the two portions interfitting at a parting line 123 which is preferably located at the level of the nozzle 20. At the base of the insulating jacket 120, a flat disk of insulation 125 is provided to overlie and insulate the conducting plate 110. While it will be apparent to one skilled in the art that a number of different insulating materials may be employed, the insulation is preferably formed in a die using expanding pellets of plastic such as polystyrene or the like which provides the necessary clearance spaces for the gas lines and hold down clips 105, 106 while providing a smooth outer surface which may be given an attractive finish coat. It may be noted in FIG. 1 that installation of the cap 122 insures that the hold down clips 105 and 106 are in the engaged position.

It is found that the above arrangement refrigerates even the upper extremity of the whipped cream maker with good efficiency under cool ambient conditions, for example, where the place of use is air conditioned with the jacket plain, as shown, or provided with fins at its lower end. It will be apparent to one skilled in the art, however, that if the device is to be used under warm ambient conditions additional refrigeration may be provided, either by directing flow of refrigerated air from the rail to the mixing chamber through suitable ports in the jacket or by use of an auxiliary refrigerator coil surrounding the mixing chamber.

It will be apparent from the above discussion that the whipped cream maker is ideally suited for use in soda fountains and the like because of the possibility of integrating it with existing syrup rail and refrigeration facilities. The unit is particularly compact, attractive in appearance, convenient to use, and does not take up any additional counter space. The reservoir contains sufficient liquid cream so that the unit does not require more than daily replenishing even in a busy fountain serviced by a number of waitresses or attendants. The action takes only a few seconds per batch and consequently a single unit is adequate for most fountain installations. In operation, the waitress simply slides the glass or container under the nozzle as shown in FIG. 1, pulls the handle forwardly and hesitates momentarily at the forward portion of the stroke in order to permit complete discharge of an individual sized serving, after which the handle is simply released returning to its upright position by the return spring 85.

A counter may be coupled to the operating lever to count the number of portions if desired, only it will be apparent to one skilled in the art that the shaft of the operating lever may be oscillated by a motor controlled by a pushbutton or the like without departing from the invention.

During the rearward portion of the travel, as previously discussed in connection with FIG. 7, the mixing chamber 30 receives a "shot" of gas at an intermediate pressure as determined by the setting of the pressure regulator valve 55. At the end of the stroke, communication is established with the reservoir and a fresh charge of liquid cream is admitted to the mixing chamber. Because of the fact that the pressures existing in the mixing chamber and in the reservoir are accurately predetermined, liquid cream will flow into the mixing chamber only up to a precisely predetermined level, i.e., a level at which the pressure differential is zero. Because of the extreme agitation which occurs on admission of the liquid cream into the mixing chamber through the spray jet 45, intermediate intimate mixture between the gas in the mixing chamber and the admitted cream takes place and it is thus possible to promptly recycle the handle to secure another individual sized batch. The nature of the whipped cream produced by this device is consistent from batch to batch, and where it is desired to make minor changes in the consistency, this can be easily accomplished by adjustment of the two pressure regulators 51, 55. The spray nozzle 45 is so chosen as to provide high velocity combined with an adequate rate of flow.

In order to relieve the pressure prior to assembling the unit a venting valve is included in the system. Such valve, indicated at 131 in FIG. 6, is preferably a three-way, two-position valve. Thus, prior to disassembling the unit, the operating handle is turned so that the reservoir 11 is vented to the atmosphere. The insulating cap 122 is removed followed by removal of the nozzle 20. This enables the gas lines 54, 58 to be retracted from their bores in the valve body where they have a slip-joint connection with suitable O-rings. The retaining clips 105, 106 then may be released following which the whipped cream maker as a unit may be withdrawn from the conducting sleeve or jacket 100. The reservoir 11 may then be twisted with respect to the valve body, releasing the joint 31, and an additional supply of liquid cream may be added. It is to be noted that very little of the gas contained in the reservoir becomes dissolved in the cream so that the reservoir may be removed without any risk of frothing or overflow. The reservoir may be cleaned at time of removal and this is facilitated by the removable cap at the bottom of the reservoir which provides unobstructed access for a large size bottle brush or the like. At the same time the valve may be disassembled, the mixing chamber may be removed and the valve body freed of all of its various attachments so that the ports may be penetrated by a suitable small diameter brush.

After the reservoir has been replenished with liquid cream, it is attached to the valve body, and with the nozzle mixing chamber and valves in place, the entire unit may be telescoped into the metallic jacket 100. The gas lines 54, 58 may be inserted and the clips, 105, 106 snapped in place. Following this, the insulating jackets may be slipped over the unit, nozzle reapplied, and the venting valves turned to normal feed-through position to reestablish pressure in the reservoir. Reestablishing of pressure in the mixing chamber will require moving the operating handle to the mid position momentarily so that it receives a shot of gas through the line 58.

The unit is simple and of inherently low cost for handling production of whipped cream on an individual batch basis at a much lower cost, per serving, than where precharged containers of cream must be used. Moreover, the unit may be charged with liquid cream which is readily available as often as may be necessary and there is no need to depend upon an inventory of charged containers, particularly during periods of peak business.

We claim as our invention:

1. A device for making and dispensing individual metered portions of whipped cream suitable for installation in a soda fountain comprising in combination a valve body, a reservoir for liquid cream secured to the underside of the valve body, a mixing chamber on said valve body, means for positively applying gas at a high pressure to said reservoir so that the liquid cream therein tends to be forced upwardly into the valve body, conduit means including a first valve port for positively applying aerating gas to the mixing chamber at a lower pressure which is sufficient to aerate liquid cream, a mixing spray head in the mixing chamber, conduit means including a second valve port for connecting the reservoir to the spray head, the differential pressure between the pressure in the reservoir and the pressure in the mixing chamber being sufficient to produce high velocity discharge of liquid cream through the spray head and into the mixing chamber for intimate mixture with the aerating gas in the latter accompanied by a build up of pressure in the mixing chamber until the pressure tends to equalize the pressure in the reservoir to cut off further flow of liquid cream, the volume of the mixing chamber being sufficiently small so that such equalization occurs with an amount of cream in the mixing chamber corresponding to a single serving, a discharge nozzle on said valve body, conduit means including a third valve port in said valve body for connecting the mixing chamber to the nozzle so that the pressurized aerated cream is free to escape from the mixing chamber and to expand in said nozzle into whipped form until the aerated cream in the mixing chamber is substantially fully discharged as a single serving, and operating means for opening said valve ports including an operating handle movable between a start limit position in which the second port is opened for flow of liquid cream to the mixing chamber and a second limit position in which the third port is opened for discharge of cream through the nozzle, the first port being so arranged as to be opened at midrange for recharging of the mixing chamber with gas as the operating handle is moved back to its start position.

2. The combination as set forth in claim 1 including biasing means for returning the handle to its start position so that the mixing chamber is both pressurized and contains a charge of aerated cream at the time that the handle is moved to produce a subsequent serving.

3. The combination as set forth in claim 1 including a check valve associated with the first valve port for preventing retrograde flow of aerated cream through the first valve port as the operating handle transverses the midrange on its way from the start limit position to the second limit position.

References Cited by the Examiner
UNITED STATES PATENTS

| | | | |
|---|---|---|---|
| 943,060 | 12/09 | Bienz | 261—19 |
| 2,117,271 | 5/38 | Bowman. | |
| 2,531,323 | 11/50 | Connell | 62—306 X |
| 2,580,188 | 12/51 | Nilsen | 222—394 |
| 2,654,858 | 10/53 | Heesen. | |
| 2,902,266 | 9/59 | Isham | 257—263 |

FOREIGN PATENTS

| | | |
|---|---|---|
| 690,067 | 6/30 | France. |
| 953,421 | 11/56 | Germany. |
| 25,501 | 1908 | Great Britain. |

HARRY B. THORNTON, *Primary Examiner.*

CHARLES SUKALO, HERBERT L. MARTIN,
*Examiners.*